United States Patent
Ross et al.

(10) Patent No.: US 12,470,427 B2
(45) Date of Patent: Nov. 11, 2025

(54) CONTROLLER AREA NETWORK (CAN) TRANSMITTER

(71) Applicant: Allegro MicroSystems, LLC, Manchester, NH (US)

(72) Inventors: Thomas Ross, West Lothian (GB); James McIntosh, East Lothian (GB)

(73) Assignee: Allegro MicroSystems, LLC, Manchester, NH (US)

( * ) Notice: Subject to any disclaimer, the term of this patent is extended or adjusted under 35 U.S.C. 154(b) by 112 days.

(21) Appl. No.: 18/491,886

(22) Filed: Oct. 23, 2023

(65) Prior Publication Data

US 2025/0132946 A1    Apr. 24, 2025

(51) Int. Cl.
*H04L 12/40* (2006.01)
*H04B 3/04* (2006.01)

(52) U.S. Cl.
CPC .............. *H04L 12/40* (2013.01); *H04B 3/04* (2013.01); *H04L 2012/40215* (2013.01)

(58) Field of Classification Search
CPC .. H04L 12/40; H04L 2012/40215; H04B 3/04
See application file for complete search history.

(56) References Cited

U.S. PATENT DOCUMENTS

| | | | |
|---|---|---|---|
| 6,326,817 B1 * | 12/2001 | Boezen | H03F 3/45704 327/90 |
| 7,091,876 B2 | 8/2006 | Steger | |
| 7,567,105 B2 * | 7/2009 | Trichy | G06F 13/4072 327/170 |
| 9,509,488 B1 * | 11/2016 | Huang | H04L 25/0276 |
| 10,216,559 B2 | 2/2019 | Fernandez | |
| 10,747,708 B2 | 8/2020 | Kozomora et al. | |
| 10,778,481 B1 * | 9/2020 | Glenn | H04L 7/0041 |
| 10,785,066 B1 * | 9/2020 | van Dijk | H04L 25/0272 |
| 10,892,759 B1 * | 1/2021 | Lee | H04L 12/40013 |
| 11,063,561 B1 * | 7/2021 | Huang | H04L 12/40 |
| 12,255,680 B2 * | 3/2025 | Banerjee | H04B 1/405 |

(Continued)

OTHER PUBLICATIONS

U.S. Appl. No. 17/663,930, filed May 18, 2022, Friedrich, et al.

(Continued)

*Primary Examiner* — Henry Tsai
*Assistant Examiner* — Christopher A Daley
(74) *Attorney, Agent, or Firm* — DALY, CROWLEY, MOFFORD & DURKEE, LLP

(57) ABSTRACT

A CAN transmitter includes an output branch, a replica branch including a replica of the output branch, and a feedback network. The output branch includes a first resistive element controlled by a first bias voltage and a second resistive element controlled by a second bias voltage. The replica branch has a feedback node that is replicated at a midpoint between the CANH bus terminal and the CANL bus terminal. The feedback network has a first input coupled to the feedback node, a second input configured to receive a midpoint reference voltage indicative of a desired midpoint voltage between the CANH and CANL terminals, and an output at which the first bias voltage is provided. A resistance controller is coupled to a control terminal of the second resistive element and configured to generate the second bias voltage based on a predetermined reference voltage and a bias current.

16 Claims, 2 Drawing Sheets

(56) References Cited

U.S. PATENT DOCUMENTS

| | | | | |
|---|---|---|---|---|
| 2015/0293542 | A1* | 10/2015 | Toda | G05D 23/27 |
| | | | | 219/494 |
| 2017/0199837 | A1* | 7/2017 | Walker | H04L 12/40169 |
| 2018/0343161 | A1* | 11/2018 | Gehring | H04L 12/40 |
| 2020/0364171 | A1* | 11/2020 | Brando | G06F 13/4022 |
| 2021/0167989 | A1* | 6/2021 | Broughton | H04L 12/40013 |

OTHER PUBLICATIONS

Deloge, et al.; "A Highly-Digitized Automotive CAN Transceiver in 0.14μm High-Voltage SOI CMOS"; Proc. of the 10$^{th}$ International Workshop on the Electromagnetic Compatibility of Integrated Circuits (EMC Compo); Edinburgh, UK; Nov. 10-13, 2015; 5 Pages.

Gomes, et al.; "EMC-EMI Optimized High Speed CAN Line Driver"; 2005 18th Symposium on Integrated Circuits and Systems Design; Florianopolis, Brazil; Sep. 4-7, 2005; 6 Pages.

Infineon Technologies AG; Data Sheet TLE9254; High Speed Dual CAN Transceiver with Bus Wake-up; Rev. 1.0; Oct. 16, 2019; 37 Pages.

Kang, et al.; Controller Area Network with Flexible Data Rate Transmitter Design with Low Electromagnetic Emission; IEEE Transaction on Vehicular Technology; vol. 67; No. 8; pp. 7290-7298; Aug. 2018; 9 Pages.

Magnus-Maria Hell; The Physical Layer in the CAN FD World; The Update; Infineon; White Paper—The CAN FD Physical Layer; Sep. 13, 2016; 16 Pages.

* cited by examiner

CONTROLLER AREA NETWORK (CAN) TRANSMITTER

BACKGROUND

Controller Area Network (CAN) is a communication bus system with which devices send and receive data over a two-wire bus. CAN transmitters convert logic signals into differential signals for transmission on the CAN bus and CAN receivers conversely convert received differential signals into logic signals for processing by a microcontroller or other processing circuitry.

CAN differential signals are transmitted on the bus terminals with opposite polarities and equal amplitudes. If the CAN bus terminal voltages do not move at the same time, by the same amount, and at the same rate of change, common mode voltage can result which can cause electromagnetic interference (EMI).

CAN is often used in automotive systems, in which the communicating devices can include various engine control units (ECU) and other subsystems and components. In automotive control systems and other safety critical applications, there are strict requirements governing EMI and electromagnetic emissions (EME) in order to ensure that CAN data transmission does not interfere with surrounding systems.

SUMMARY

The present disclosure includes circuits and methods for biasing resistive elements coupled to CAN bus terminals so as to avoid common mode disturbances on CAN bus terminals that could otherwise result in undesirable EMI and EME. Methodologies include use of a feedback network that operates on a replicated bus voltage in order to bias a resistive element to achieve a desired bus midpoint voltage and resistance matching.

According to the disclosure, a controller area network (CAN) transmitter includes an output branch, a replica branch comprising a replica of the output branch, and a feedback network. The output branch includes a first resistive element coupled between a positive supply terminal and a first CAN bus terminal and controlled by a first bias voltage and a second resistive element coupled between a second CAN bus terminal and a negative supply terminal and controlled by a second bias voltage. The replica branch has a feedback node that is replicated at a midpoint between the first CAN bus terminal and the second CAN bus terminal. The feedback network has a first input coupled to the feedback node, a second input configured to receive a midpoint reference voltage indicative of a desired midpoint voltage between the first CAN bus terminal and the second CAN bus terminal, and an output at which the first bias voltage is provided.

Features may include one or more of the following individually or in combination with other features. The replica branch can include a scaled replica of the output branch. A resistance controller can be coupled to a control terminal of the second resistive element and configured to generate the second bias voltage based on a predetermined reference voltage and a bias current. The resistance controller can further include a temperature dependent current source. The first resistive element can be a p-type transistor and the second resistive element can be an n-type transistor. Each of the first resistive element and the second resistive element can be a Field Effect Transistor (FET) or a bipolar transistor. The output branch can further include a switch element and a current limit element. The switch element can be coupled between the second CAN bus terminal and the second resistive element. The output branch can include a plurality of output branches coupled in parallel. The output branch can further include a first diode coupled between the first resistive element and the first CAN bus terminal and a second diode coupled between the second CAN bus terminal and the second resistive element. One or both of the first resistive element or the second resistive element can include a resistor coupled in parallel with the respective resistive element. The CAN transmitter can be configured for use in a gate driver and the transmitted signal is a gate drive signal.

Also described is a method for transmitting a signal over a CAN bus having a first bus terminal coupled to a second bus terminal through a load resistor, including coupling a first resistive element between a positive supply terminal and the first bus terminal, wherein the first resistive element is controlled by a first bias voltage, coupling a second resistive element between the second bus terminal and negative supply terminal, wherein the second resistive element is controlled by a second bias voltage, and controlling the first resistive element with a feedback network having a first input coupled to a feedback node, a second input configured to receive a midpoint reference indicative of a desired midpoint voltage between the first CAN bus terminal and the second CAN bus terminal, and an output at which the first bias voltage is provided.

Features may include one or more of the following individually or in combination with other features. The method can include providing a replicated first resistive element and a replicated second resistive element with a replica branch having the feedback node between the replicated first resistive element and the replicated second resistive element. The first resistive element can have a size that is a multiple of the replicated first resistive element and the second resistive element can have a size that is a multiple of the replicated second resistive element. The method can include controlling the second resistive element with a resistance controller coupled to a control terminal of the second resistive element and configured to generate the second bias voltage based on a predetermined reference voltage and a bias current.

BRIEF DESCRIPTION OF DRAWINGS

The foregoing features of this disclosure, as well as the disclosure itself, may be more fully understood from the following description of the drawings in which.

DETAILED DESCRIPTION

Figure 1:
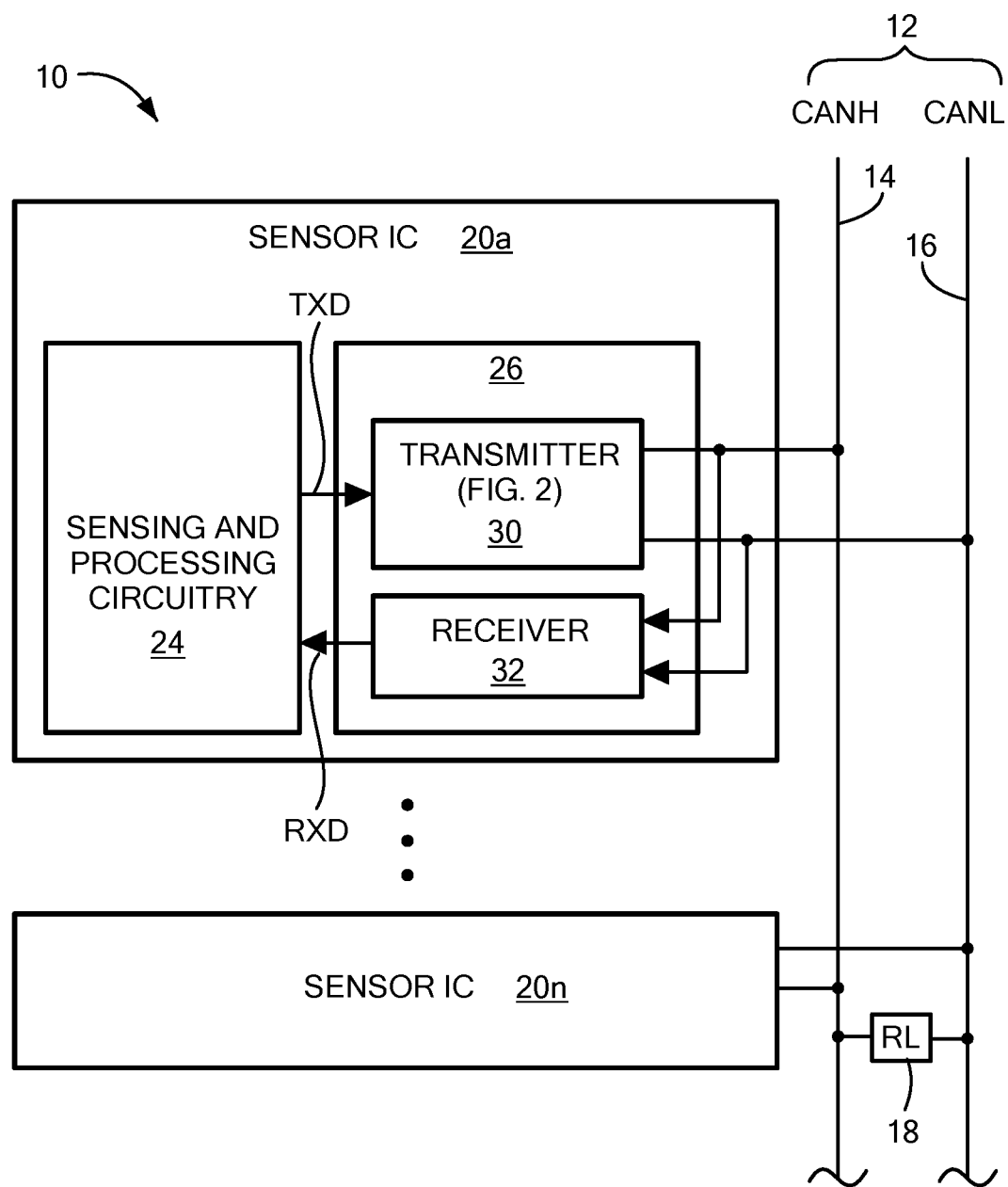
FIG. 1 is a block diagram of a sensor integrated circuit including a CAN transceiver according to the disclosure.

Referring to FIG. 1, a CAN system 10 includes a plurality of devices 20a-20n, each coupled to a CAN communication bus 12. The CAN bus 12 includes a first, CANH bus line 14 and a second, CANL bus line 16, configured to communicate differential signals to and from the coupled devices 20a-20n. In use, an external terminator, or termination resistor RL 18 is coupled between bus lines 14, 16.

CAN devices 20a-20n have terminals coupled to the CAN bus lines 14, 16. As labeled for example device 20a, each device can include sensing and processing circuitry 24 and a transceiver 26, including a transmitter 30 and a receiver 32, both coupled to the bus 12 as shown. In general, sensing and processing circuitry 24 is configured to generate a signal TXD to be transmitted on the CAN bus 12 and is configured to receive a signal RXD.

Example CAN devices 20a-20n can be sensor integrated circuits (IC). More generally however, CAN devices 20a-20n can take various forms to communicate any data type.

System 10 can be used in various applications including, but not limited to automotive applications. In an example, sensor ICs 20a-20n can be automotive sensors and/or ECUs of various types, as may control various automotive features and functions. Further, such sensors 20a-20n can operate on various sensing methodologies, such as magnetic field sensing, optical sensing, inductive sensing, pressure sensing, temperature sensing, etc. As a non-limiting example, one or more sensors 20a-20n can be a gate driver IC with which the transmitted signal is a gate drive signal. However, it will be appreciated by those of ordinary skill in the art that CAN devices 20a-20n are not limited to any particular type of device and CAN system 10 is not limited to any particular communication application.

Figure 2:
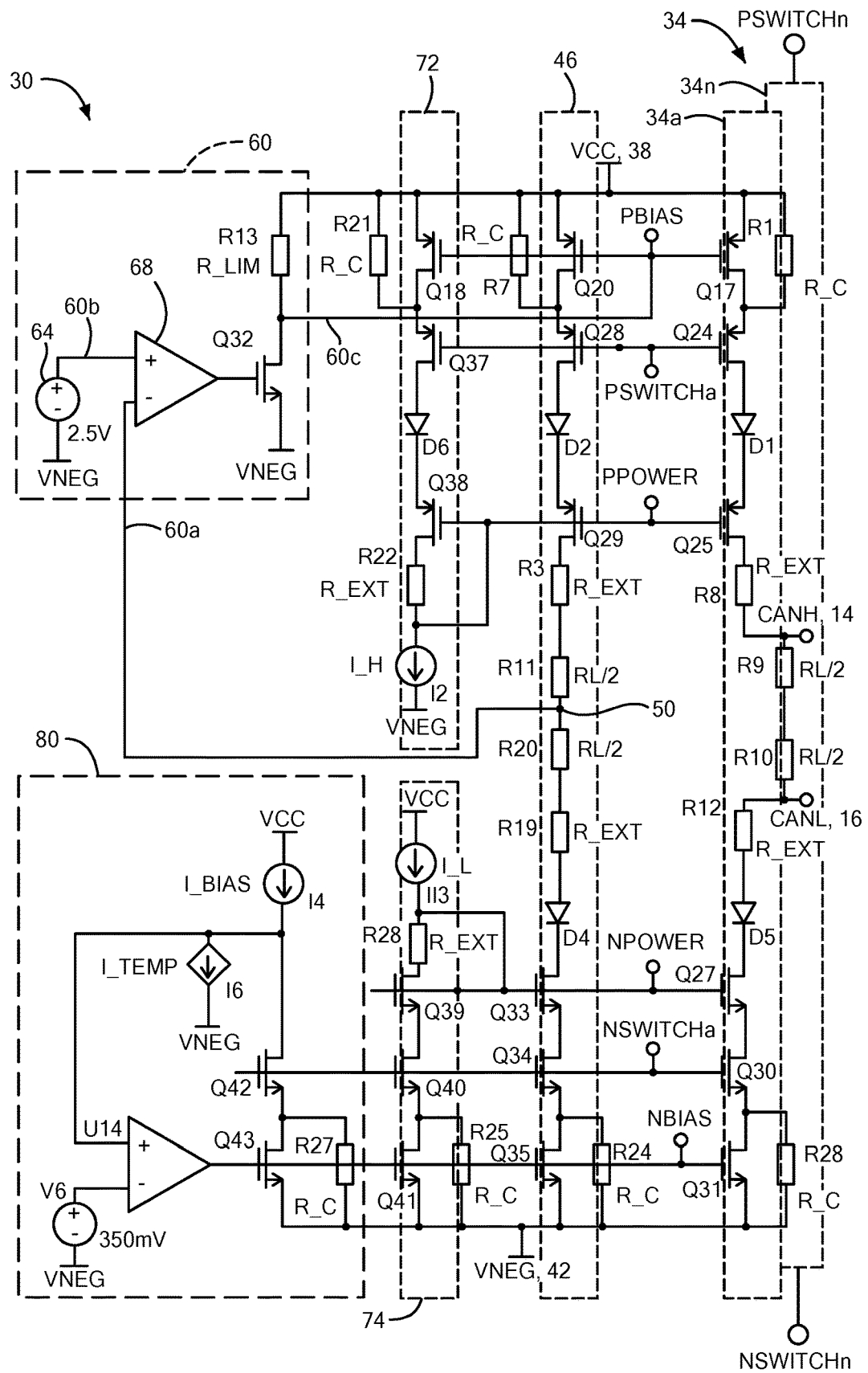
FIG. 2 is a schematic illustrating a CAN transmitter according to the disclosure.

Referring also to FIG. 2, according to the disclosure, transmitter 30 includes an output branch 34 having resistive elements biased and coupled in a resistor divider arrangement between a positive supply terminal VCC 38 and a negative supply terminal VNEG 42. More particularly, a first resistive element Q17 is coupled between VCC 38 and the CANH bus line 14 and a second resistive element Q31 is coupled between the CANL bus line 16 and VNEG 42. Reference numbers 14, 16 are used interchangeably to refer to the CAN bus lines CANH 14, CANL 16 and also to the terminals of the devices 20a-20n that are coupled to CANH, CANL.

Resistive element Q17 is controlled by a first bias voltage PBIAS and resistive element Q31 is controlled by a second bias voltage NBIAS. Because common mode voltage on the CAN bus lines 14, 16 can cause undesirable EMI, resistance matching between VCC-CANH and CANL-VNEG is important. Described circuitry and techniques generate the bias voltages PBIAS, NBIAS so as to achieve a desired bus midpoint voltage and resistance matching.

Also shown in FIG. 2 are external termination resistors R9, R10, each of which has a value RL/2. Resistors R9, R10 can provide terminator 18 of FIG. 1.

The output branch 34 includes a high side arrangement of series-coupled elements and a low side arrangement of series-coupled elements. The high side series-coupled elements can include a first switch Q24, a first diode D1, a first current limit element Q25, and a first resistor R8 with a value R_EXT. The low side series-coupled elements can include a second resistor R12 with a value R_EXT, a second diode D5, a second current limit element Q27, and a second switch Q30. In general, diodes D1, D2 protect the transmitter 30 from excessive voltages on the CAN bus terminals 14, 16. In other words, diode D5 prevents the circuitry below it in FIG. 2 from going below ground when CANL goes negative. Diode D1 prevents the circuitry above it in FIG. 2 from going above supply. For non-isolated processes (i.e., not silicon on insulator) in which the cathode sits in the substrate at 0V, the cathode of diode D1 is isolated from CANH by switch Q25 as is necessary in order to permit the CANH pin to go more negative than a diode drop below the substrate.

Elements of the output branch 34 including resistive elements Q17, Q31, current limit elements Q25, Q27, and switches Q24, Q30 can take the form of transistors. Example elements are Field Effect Transistors (FETs), with elements Q17, Q24, and Q25 being p-type devices, here PMOS FETs, and elements Q27, Q30, and Q31 being n-type devices, here NMOS FETs. In the context of FETs, the gate terminal is referred to herein as the control terminal and elements coupled in parallel with a FET are coupled between the source and drain terminals. It will be appreciated by those of ordinary skill in the art that bipolar transistors or other element types are possible and that use of p-type devices versus n-type devices can be varied.

Current limit elements Q25, Q27 are controlled by PPOWER and NPOWER control signals, respectively, to limit current through the output branch 34. For NPOWER, I_L flows into resistor R28 and the FETs below R28 which look like resistors. Similarly, for PPOWER, I_H flows through resistor R22 and the FETs above R22 which look like resistors.

Switches Q24, Q30 are controlled so as to switch the elements coupled in series with these switches in and output of the circuit.

In embodiments, the output branch 34 can include a plurality of like branches, or stages 34a-34n coupled in parallel, where "n" is the number of parallel-coupled branches. Use of multiple parallel stages 34a-34n advantageously permits the desired equivalent output stage resistances to be achieved with smaller voltage increments on the CANH and CANL bus lines 14, 16, thereby permitting more precise resistance control than otherwise possible.

More particularly, each of the output stages 34a-34n is switched one at a time so as to control the resulting parallel resistance in a more incrementally controllable manner. To this end, a plurality of control signals PSWITCHa-PSWITCHn can be provided to control a resistive element (like illustrated resistive element Q17) of the respective output stage 34a-34n. Similarly, a plurality of control signals NSWITCHa-NSWITCHn can be provided to control a resistive element (like illustrated resistive element Q30) of the respective output stage 34a-34n.

For simplicity, the output branch 34 is described with reference to elements of branch 34a, which branch is referred to herein interchangeably as output branch 34. Also, the control signals PSWITCHa-PSWITCHn and NSWITCHa-NSWITCHn are referred to herein interchangeably with PSWITCH, NSWITCH, respectively. Switches Q24, Q30 (and like switches in any additional output stages 34b-34n) can be controlled by a drive signal fed through a chain of buffers (each of which can be formed from two inverters in series) in a controlled timing manner that may include sequential or simultaneous control for example.

The transmitter 30 includes a high side bias branch 72 configured to bias the resistive element Q17 and a low side bias branch 74 configured to bias the element Q31. In the example embodiment in which the resistive elements Q17, Q31 are FETs, the resistances of these FETs are adjusted by adjusting their respective gate voltages. In general, bias branches 72, 74 have all FET gates at the correct voltage or bias point per the bias condition (e.g., the master bias condition being matching the total resistance on top and bottom for common mode replica node 50 of VDD/2 as set by block 60, for given output current and for given differential voltage. Differential amplifier U14 sets up drain of transistor Q42 to 0.35V and the current is IBIAS-ITEMP. From Q42 drain to ground it looks like a resistor (V/I) and this condition mirrors across to the output so when current in output leg 34 is approximately a scaled version of (IBIAS-ITEMP), the voltage at the drain of transistor Q30 is 350 mV. The differential voltage is a scaled version of (IBIAS-ITEMP) times RL.

The high side bias branch 72 can include a resistive element Q18, a switch Q37, a diode D6, a current limit element Q38, a resistor R22 with a value R_EXT, and a current sink I2 that sinks a current I_H, coupled in series between the positive supply terminal VCC 38 and the negative supply terminal VNEG 42. The low side bias branch 74 can include a current source I13 that sources a current I_L, a resistor R28 with a value R_EXT, a current limit element Q38, a switch Q40, and a resistive element Q41 coupled in series between the positive supply terminal VCC 38 and the negative supply terminal VNEG 42. Currents I_L and I_H are scaled down versions of the output stage current limit.

Transmitter 30 includes a replica branch 46 that contains elements replicating like elements of the output branch 34 such that branch 46 is a replica of output branch 34. To this end, replica branch 46 includes a resistive element Q20, a switch Q28, a diode D2, a current limit element Q28, resistors R3, R19 each having a value R_EXT, resistors R11, R20 each having a value RL/2 to replicate the external resistors R9, R10, a diode D4, a current limit element Q33, a switch Q34, and a resistive element Q35, all coupled in series between positive supply terminal VCC 38 and negative supply terminal VNEG 42, and each of which can be the same as or similar to like elements of the output branch (i.e., resistive element Q17, switch Q24, diode D1, current limit element Q25, resistor R8, external resistors R9, R10, resistor R12, diode D5, current limit element Q27, switch Q30, and resistive element Q31 of the output branch 34, respectively).

The replica branch 46 can be a scaled version of the output branch 34. For example, the resistive element Q17 of the output branch 34 can have a size that is a multiple of the size of the replicated resistive element Q20 of the replica branch 46. Similarly, the resistive element Q31 of the output branch 34 can have a size that is a multiple of the size of the replicated resistive element Q35 of the replica branch 46. With this arrangement, the replica branch 46 can provide an accurate indication of voltages of the output branch 34, but with scaled components requiring smaller circuit area and lower power dissipation.

Replica branch 46 has a feedback node 50 that is replicated at a midpoint between the CAN bus terminals 14, 16. While voltages at the CAN terminals CANH, CANL can be high voltages and fast moving, thereby being subject to noise, the voltage at the feedback node 50 advantageously does not experience large or fast voltage swings, thereby making node 50 an accurate indication of the voltage midpoint between the CAN bus terminals 14, 16.

According to an aspect of the disclosure, transmitter 30 includes a feedback network 60 having a first input 60a coupled to the feedback node 50, a second input 60b coupled to receive a midpoint reference voltage 64 indicative of a desired midpoint voltage between the bus terminals 14, 16, and an output 60c at which the first bias voltage PBIAS is provided. In an example in which the positive supply VCC 38 is nominally 5.0 volts and the negative supply VNEG 42 is at ground, the desired midpoint voltage between bus terminals 14, 16 (and thus also the value of the midpoint reference voltage 64) can be 2.5 volts.

A differential amplifier 68 has a non-inverting input coupled to receive the midpoint reference voltage 64 and an inverting input coupled to the feedback node 50. An output of the amplifier 68 can be coupled to a transistor Q32 and the first bias voltage PBIAS can be provided between a resistor R13 having a value R_LIM and transistor Q32, at feedback network output terminal 60c, as shown. In some embodiments, resistor R13 can be a predetermined current source of relatively low current to avoid unnecessary power dissipation. It will be appreciated by those or ordinary skill in the art that feedback network 60 is illustrative only and can be varied without departing from the spirit of the disclosure. For example, elements R13 and Q32 could be replaced with other elements by which the first bias voltage PBIAS is generated.

With this arrangement, the feedback network 60 compares the feedback node voltage 50 (which is a replica at the common mode output) to an ideal midpoint voltage 64 and provides the first bias voltage PBIAS to drive the resistive element Q17 so as to cause the voltage midpoint between the CAN bus terminals 14, 16 to be equal to the ideal midpoint reference voltage 64, and here to 2.5V. This arrangement provides accurate common mode control by ensuring that the resistances between VCC-CANH and CANL-VNEG match and that the desired bus midpoint voltage is achieved, thereby reducing or eliminating EMI and EME in a manner that accounts for process, voltage and temperature variations. It will be appreciated by those of ordinary skill in the art that ideal midpoint voltage 64 is based on VCC 38. In other words, an ideal midpoint reference voltage 64 of 2.5V corresponds to a VCC voltage of 5.0V, but if VCC is not 5.0V, the ideal midpoint voltage 64 is adjusted accordingly (e.g., for a VCC voltage of 5.5V, the ideal midpoint reference voltage 64 is 2.75V).

The transmitter 30 includes a resistance controller 80 coupled to a control terminal of the second resistive element Q31 and configured to generate the bias voltage NBIAS based on a predetermined reference voltage from a voltage source V6 and a bias current I_BIAS from a current source 14. In an example, the predetermined reference voltage can be 350 mV. With knowledge of the desired output common-mode and desired differential voltage for a given supply voltage and load resistor, the predetermined reference voltage from voltage source V6 can be selected in order to apportion the voltage drop so that over process variations and temperature, the output is as desired.

In an example embodiment, the resistance controller 80 includes a differential amplifier U14 having an inverting input coupled to the voltage source V6 and a non-inverting input coupled to the bias current source 14. An output of the amplifier U14 can be coupled to a control terminal of a transistor Q43, which transistor Q43 is coupled in series with a transistor Q42 and bias current source 14, as shown.

With this arrangement, resistance controller 80 b biases low-side logic NMOS FETs Q41, Q35, Q31 in their triode region in a feed forward manner. In this way, resistive element Q31 provides a resistance that is invariant to process, voltage, and temperature.

The resistance controller 80 can include a temperature dependent current source I6 with which a temperature current I_TEMP is provided. In order to maintain the same voltage at the drain of transistor Q42 as temperature goes up (given that FET resistance typically increases with temperature), less current is needed. ITEMP goes up with temperature so that it steals some of the IBIAS current. With this arrangement, the current to transistors Q42 and Q43 reduces as intended and the drain voltage stays the same.

CAN transmitter 30 is arranged with series strings of transistors with coupled control terminals and common control (i.e., horizontal rows of commonly controlled FETs in the view of FIG. 2). For example, on the high side, transmitter 30 includes a bias string of elements Q18, 120, and Q17 all controlled by PBIAS, a switch string of elements Q37, Q28, and Q24 all controlled by PSWITCH, and a current limit string of elements Q38, Q29, and Q25 all controlled by PPOWER. On the low side, transmitter 30 includes a bias string of elements Q41, Q35, and Q31 all controlled by NBIAS, a switch string of elements Q40, Q34, and Q30 all controlled by PSWITCH, and a current limit string of elements Q39, Q33, and Q27 all controlled by NPOWER.

It will be appreciated by those of ordinary skill in the art that although the illustrated transmitter 30 has the series strings in order the current limit strings (controlled by PPOWER and NPOWER) coupled to the CAN bus lines 14, 16, the bias strings (controlled by PBIAS and NBIAS) closest to the positive supply VCC and negative supply VNEG, respectively, and the switch strings (controlled by PSWITCH and NSWITCH) between the respective current limit and bias strings, other orders of these series strings and their respective functions are possible. As one non-limiting example, the switch string (including elements Q40, Q34, and Q30) can be "above" the current limit string (including elements Q39, Q33, and Q27) such that transistor Q30 is coupled to resistor R12, with the current limit string either above or below the bias string (including elements Q41, Q35, and Q31).

One or more of the transmitter elements can have a resistor coupled in parallel. For example, resistive element Q17 has a parallel coupled resistor R28 and resistive element Q31 has a parallel coupled resistor R1. The purpose of these parallel coupled resistors is to ease the drive voltage requirement. In other words, since the gate drive voltages are constrained between VCC, VNEG, by reducing the effective resistance, the resistance of the driven FET can be higher to achieve the same overall target resistance (which means lower drive voltage requirement on the gate).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

Having described preferred embodiments of the present disclosure, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A controller area network (CAN) transmitter for transmitting a signal comprising:
    an output branch comprising a first resistive element coupled between a positive supply terminal and a first CAN bus terminal and controlled by a first bias voltage and a second resistive element coupled between a second CAN bus terminal and a negative supply terminal and controlled by a second bias voltage;
    a replica branch comprising a replica of the output branch and having a feedback node that is replicated at a midpoint between the first CAN bus terminal and the second CAN bus terminal; and
    a feedback network having a first input coupled to the feedback node, a second input configured to receive a midpoint reference voltage indicative of a desired midpoint voltage between the first CAN bus terminal and the second CAN bus terminal, and an output at which the first bias voltage is provided.

2. The CAN transmitter of claim 1 wherein the replica branch comprises a scaled replica of the output branch.

3. The CAN transmitter of claim 1 further comprising a resistance controller coupled to a control terminal of the second resistive element and configured to generate the second bias voltage based on a predetermined reference voltage and a bias current.

4. The CAN transmitter of claim 3 wherein the resistance controller further comprises a temperature dependent current source.

5. The CAN transmitter of claim 1 wherein the first resistive element comprises a p-type transistor and wherein the second resistive element comprises an n-type transistor.

6. The CAN transmitter of claim 5 wherein each of the first resistive element and the second resistive element comprises a Field Effect Transistor (FET) or a bipolar transistor.

7. The CAN transmitter of claim 1 wherein the output branch further comprises a switch element and a current limit element.

8. The CAN transmitter of claim 7 wherein the switch element is coupled between the second CAN bus terminal and the second resistive element.

9. The CAN transmitter of claim 1 wherein the output branch comprises a plurality of output branches coupled in parallel.

10. The CAN transmitter of claim 1 wherein the output branch further comprises a first diode coupled between the first resistive element and the first CAN bus terminal and a second diode coupled between the second CAN bus terminal and the second resistive element.

11. The CAN transmitter of claim 1 wherein one or both of the first resistive element or the second resistive element comprises a resistor coupled in parallel with the respective resistive element.

12. The CAN transmitter of claim 1 wherein the CAN transmitter is configured for use in a gate driver and the transmitted signal is a gate drive signal.

13. A method for transmitting a signal over a CAN bus having a first bus terminal coupled to a second bus terminal through a load resistor, comprising:
- coupling a first resistive element between a positive supply terminal and the first bus terminal, wherein the first resistive element is controlled by a first bias voltage;
- coupling a second resistive element between the second bus terminal and negative supply terminal, wherein the second resistive element is controlled by a second bias voltage; and
- controlling the first resistive element with a feedback network having a first input coupled to a feedback node, a second input configured to receive a midpoint reference indicative of a desired midpoint voltage between the first CAN bus terminal and the second CAN bus terminal, and an output at which the first bias voltage is provided.

14. The method of claim 13 further comprising providing a replicated first resistive element and a replicated second resistive element with a replica branch comprising the feedback node between the replicated first resistive element and the replicated second resistive element.

15. The method of claim 14 wherein the first resistive element can have a size that is a multiple of the replicated first resistive element and wherein the second resistive element can have a size that is a multiple of the replicated second resistive element.

16. The method of claim 13 further comprising controlling the second resistive element with a resistance controller coupled to a control terminal of the second resistive element and configured to generate the second bias voltage based on a predetermined reference voltage and a bias current.

* * * * *